(12) United States Patent
Stekelenburg

(10) Patent No.: US 6,512,309 B2
(45) Date of Patent: Jan. 28, 2003

(54) SERIALIZABLE POWER RECEIVER/SUPPLY UNIT

(75) Inventor: Albert Stekelenburg, Taipei (TW)

(73) Assignee: All-Line Inc., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,558

(22) Filed: Jul. 28, 1999

(65) Prior Publication Data

US 2002/0084696 A1 Jul. 4, 2002

(51) Int. Cl.⁷ .............................................. H01R 25/00
(52) U.S. Cl. ......................... 307/36; 439/214; 439/652
(58) Field of Search ............................. 307/36; 439/214, 439/701, 791, 814, 209

(56) References Cited

U.S. PATENT DOCUMENTS

| | | | | |
|---|---|---|---|---|
| 2,447,026 A | * | 8/1948 | O'brien et al. | 439/209 |
| 2,640,125 A | * | 5/1953 | Eggers | 439/622 |
| 2,952,829 A | * | 9/1960 | Grohsgal | 439/501 |
| 4,303,295 A | * | 12/1981 | Schreder | 439/814 |
| 4,313,646 A | * | 2/1982 | Millhimes et al. | 439/215 |
| 4,639,841 A | * | 1/1987 | Salestrom et al. | 439/209 |
| 4,867,701 A | * | 9/1989 | Wiand | 439/501 |
| 5,005,104 A | * | 4/1991 | Grunert et al. | 439/814 |
| 5,292,257 A | * | 3/1994 | Milan | 439/214 |
| 5,334,033 A | * | 8/1994 | Milan | 439/214 |
| 5,582,522 A | * | 12/1996 | Johnson | 439/214 |
| 5,658,158 A | * | 8/1997 | Milan | 439/214 |
| 5,685,744 A | * | 11/1997 | Blanchot et al. | 439/701 |
| 5,788,521 A | * | 8/1998 | Milan | 439/214 |
| 5,885,109 A | * | 3/1999 | Lee et al. | 439/652 |
| 6,045,399 A | * | 4/2000 | Yu | 439/214 |
| 6,210,189 B1 | * | 4/2001 | Gantt | 439/214 |
| 6,212,088 B1 | * | 4/2001 | Yoo | 363/146 |
| 6,220,880 B1 | * | 4/2001 | Lee et al. | 439/214 |

* cited by examiner

Primary Examiner—Brian Sircus
Assistant Examiner—Roberto J. Rios
(74) Attorney, Agent, or Firm—Troxell Law Office PLLC

(57) ABSTRACT

A serializable power receiver/supply unit having a body with terminals, wiring and components, a male terminal is provided at one end of the body, and a female terminal is provided at another end. Wiring connecting the terminals and components in the body, enables one end to be used as power receiver, and the other end to be used as power supply to another unit. The components can include a socket, a timer, a surge protector device or an illuminator. The connection of the male and female terminals with the wiring is through an end seat in which the wiring terminal is inserted.

1 Claim, 5 Drawing Sheets

SERIALIZABLE POWER RECEIVER/SUPPLY UNIT

BACKGROUND OF THE INVENTION

1. Field of the Invention

The present invention relates to a serializable power receiver/supply unit, in the field of line connectors.

2. Brief Description of the Related Art

Electricity has been utilized by people for a long time, because it make people's lives very convenient and fast.

The products and appliances that are increasingly being developed all utilize electricity. For the present life circumstances, whether it is for the residence or the office, the various kinds of electric appliances increase day by day. Because of numerous electric appliances, the power receiver device is necessary.

The present power receivers have a main output connected to a power supply and preset socket holes. Electric appliances are provided with a plug, so that the current can pass through when the plug is selectively inserted into the socket. Therefore, for accommodating multiple plugs the number of the holes is increased to form a so-called "extension line".

Some extension lines are provided with the necessary electric appliance elements such as a timer, a surge protector and so on. Although such variations can save the trouble of individual installation, the installed element may lie idle during the time without the necessity for its use. Another disadvantage is that the socket must be thrown away if the surge protector device, etc. are damaged, which obviously is a waste.

SUMMARY OF THE INVENTION

The object of the present invention is to provide a serializable power receiver/supply unit which can overcome the defects of the prior art. The units are serializable to function if one of the units is damaged or not in use. The various components can also have a modular design.

The technical measures embodying the above-mentioned object of the present invention are as follows: the serializable receiver/supply unit consists of a body, terminals, wiring and components, wherein male terminals are provided at one side of a body, female terminals which can be inserted by said male terminals, and lines are connected with the components provided within the body. One end can be a power receiver, and other end can be a power supply to another unit. The components can be socket, timer, surge protector device or illuminator. The connection of said male terminal, female terminal with the wirings is inserted into the end seats of the male terminal and female terminal through the wiring terminals. Said female terminals have an end sleeve, and a central sleeve hole, and the male terminals have an end pin which is inserted into the end sleeve.

BRIEF DESCRIPTION OF THE DRAWINGS

The serializable power receiver/supply unit of the present invention will be now described in detail with reference to the embodiment shown in the drawings, wherein.

DETAILED DESCRIPTION OF THE INVENTION

As shown in drawings, the present invention comprises a terminal that is respectively provided with a male terminal on one end, and a female terminal on another end, with components provided on the body between the terminals, which function as surge protector device, multiple-hole socket, timer, etc.

Figure 1:
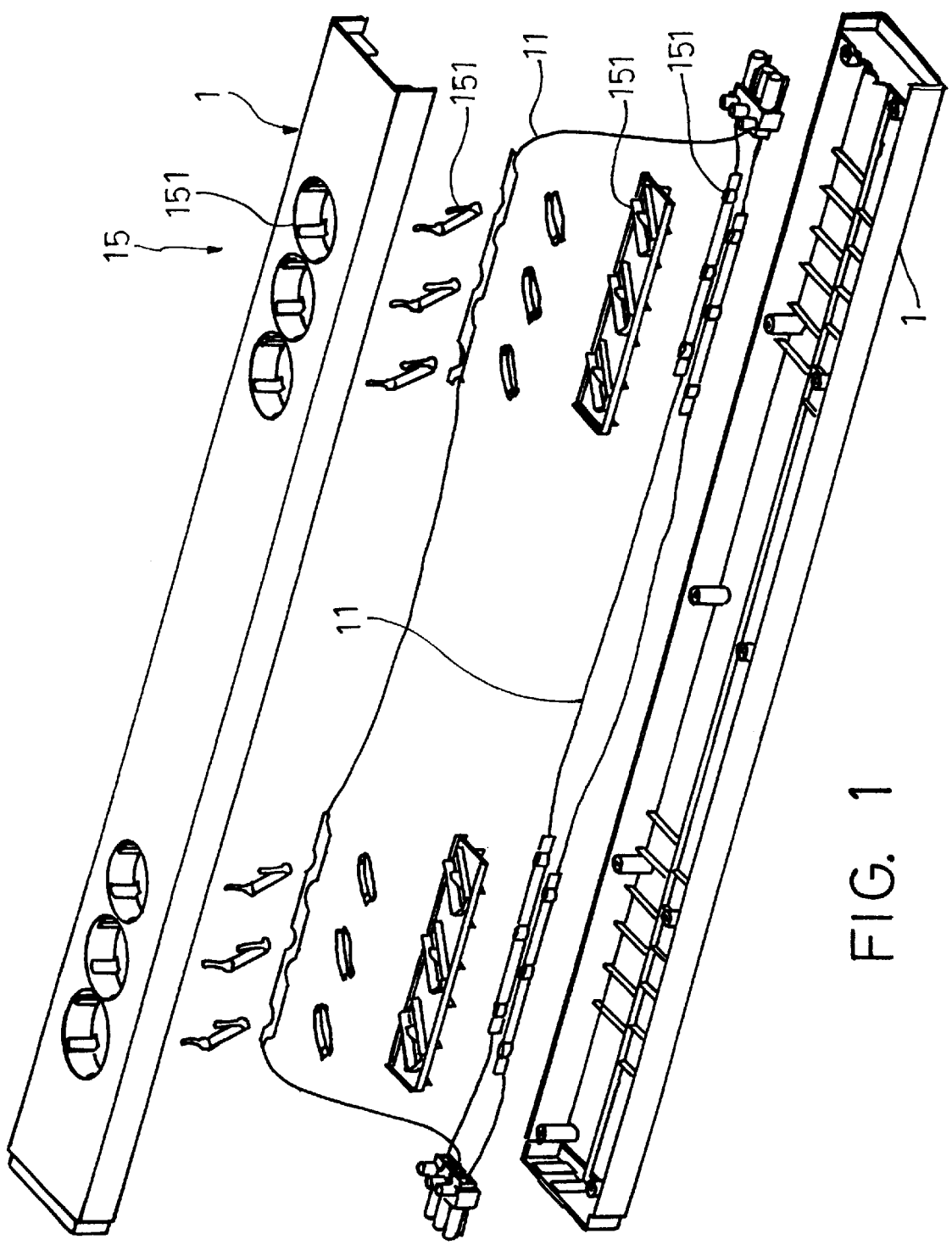
FIG. 1 is an exploded view showing the serializable power receiver/supply unit of the present invention with the multiple-hole socket.
Figure 2:
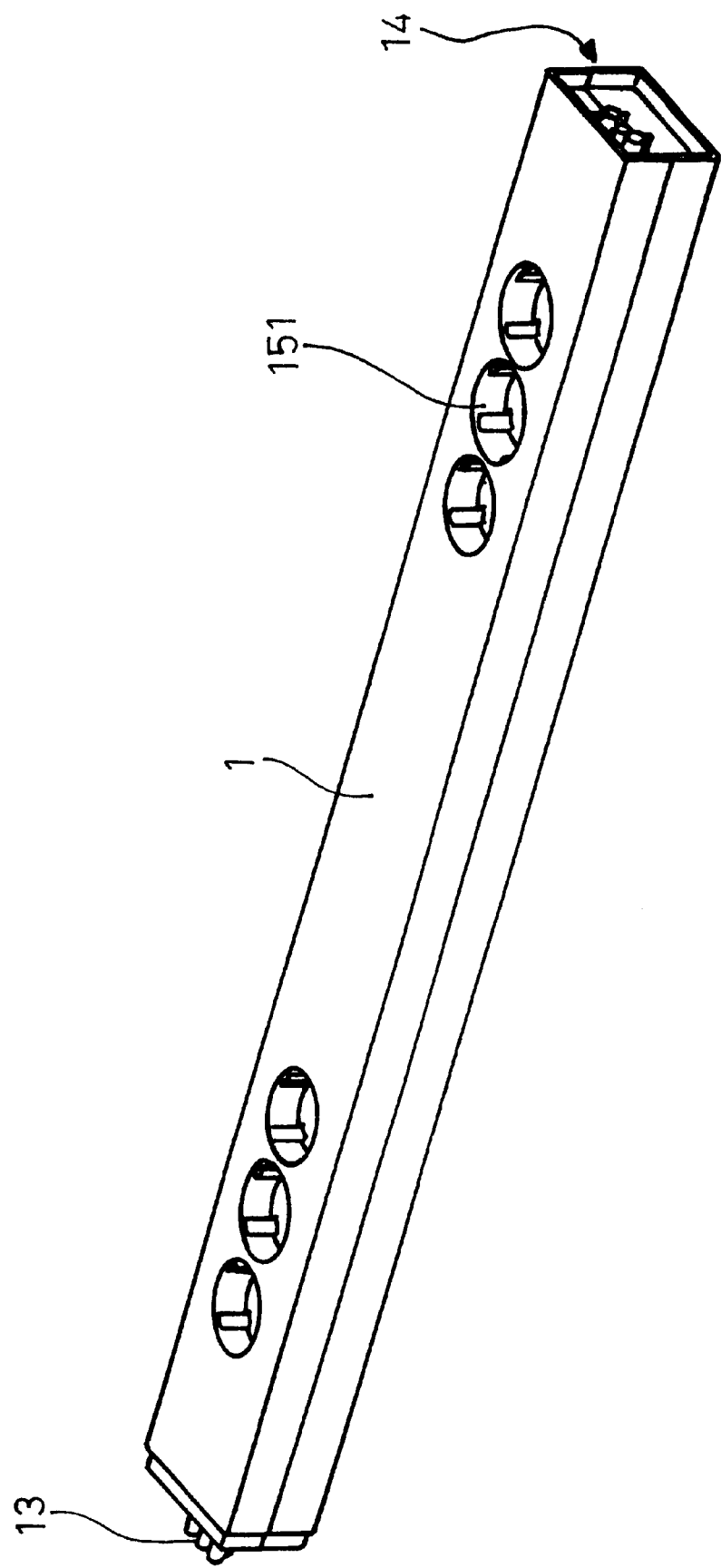
FIG. 2 is a perspective view showing the present invention assembled.
Figure 4:
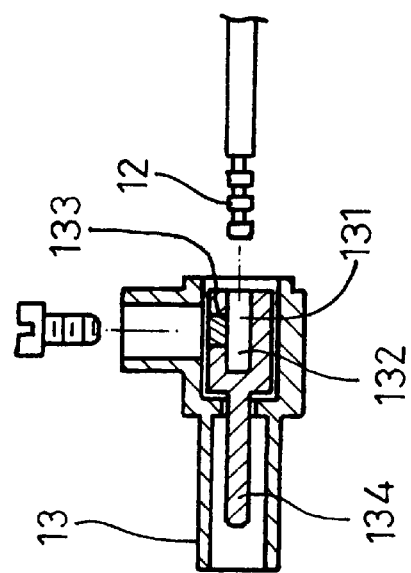
FIG. 4 is a cross-sectional view showing a male terminal of the unit for the present invention.
Figure 3:
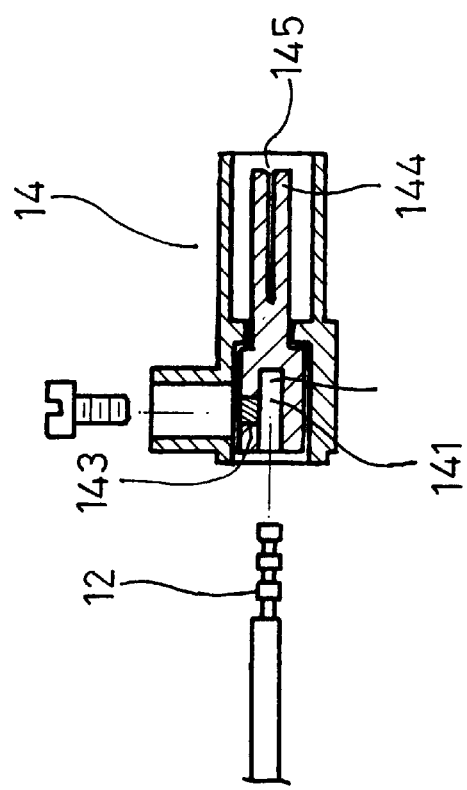
FIG. 3 is a cross-sectional view showing a female terminal of the unit of the present invention.

Referring to FIGS. 1 and 2, the multiple-hole socket for example, has wiring 11, for passing through the electrical current, in the body 1, including a namely positive pole, a negative pole and a ground pole. The wiring terminals 12 are provided at the ends of the wiring 11 (shown in FIGS. 3 and 4), and are inserted and connected to the male and female terminals.

In the external ends of the wiring terminal 12, a male terminal 13 is provided in one end, and a female terminal 14 is provided in another end. The terminals have end seats 131, 141 made of a conducting metal with internal diameters forming insertable end holes 132, 142 for said wiring terminal 12. For its constant connection, the locking holes 133, 143 can also be provided in the side of, especially above the male terminal 13 and female terminal 14, so that wiring terminals 12 are fixed by a screw.

The male terminal 13 has end pin 134 in the form of the integrated and extended bar, while female terminal 14 has end sleeve 144, with a sleeve hole 145 in the center, its internal diameter corresponding to that of said end pin 134. Each end pin 134 and 144 are isolated.

The component 15 is provided in the line between male terminal 13 and female terminal 14 in the body 1 and comprises a multiple-hole socket, which has socket elements 151 forming an inserted hole. Since these socket elements 151 are well known, they are not further described.

Referring to FIG. 2, the unit of the present invention forms a bar-like body 1 which can be used for a power receiver on its ends, the male terminal 13 is at one end, and the female terminal 14 is at another end. When one of the male terminal 13 or female terminal 14 is connected to a power supply, the female terminal 14 or male terminal in the another end can also be used as a power receiver inserted another unit.

The design of male terminal 13 and female terminal 14 can be varied, but should enable one end to be inserted into an opposite end.

Figure 5:
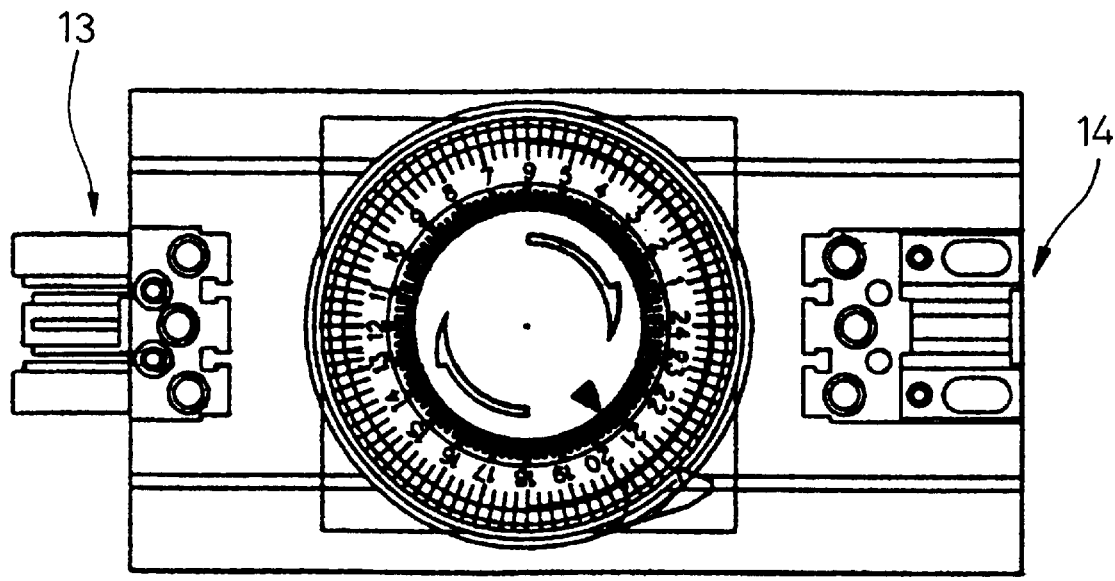
FIG. 5 is a top view showing a timer unit of the present invention.
Figure 6:
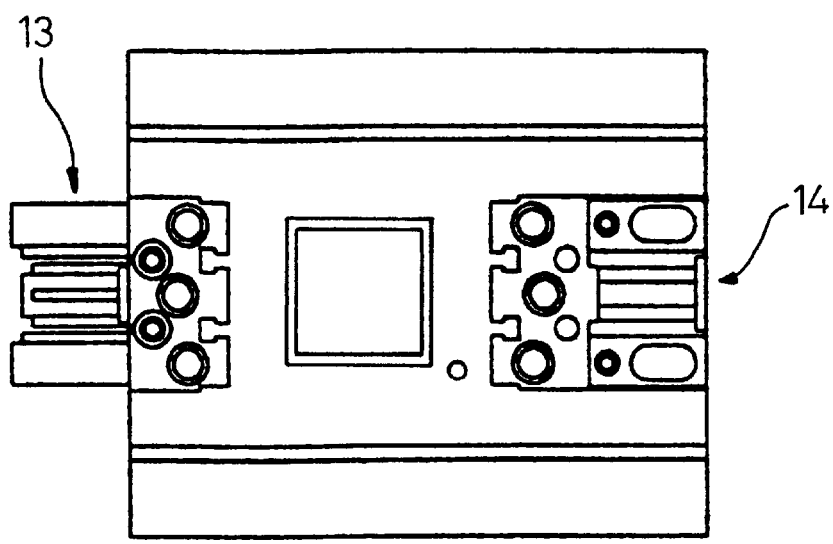
FIG. 6 is a top view showing the unit with a surge protector device.
Figure 7:
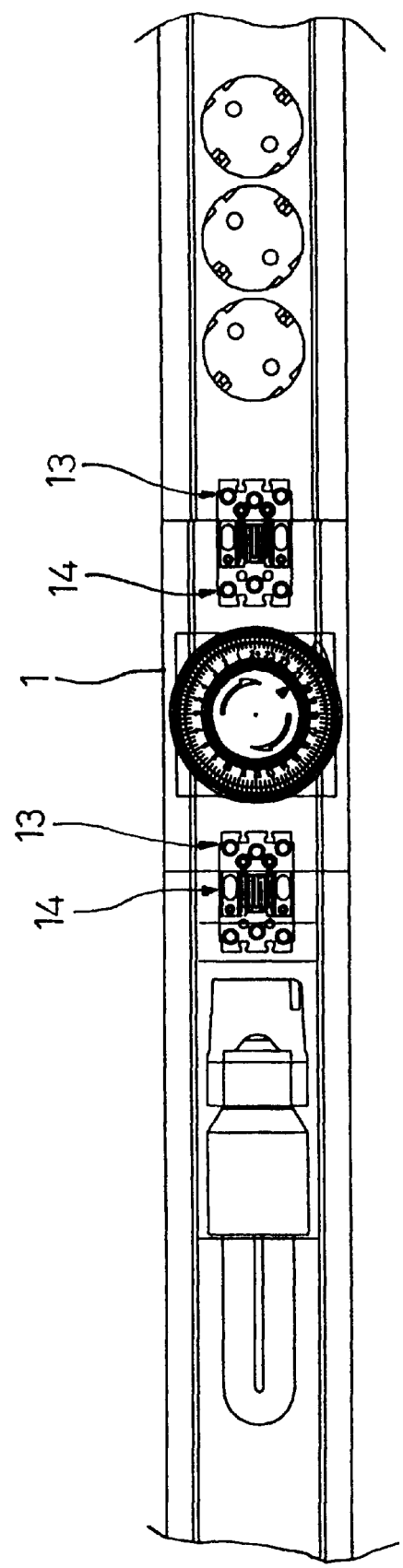
FIG. 7 is a top view showing the unit of the present invention including a variety of components in series.

Referring to FIG. 5, the unit of the present invention may include a timer, which has male and female terminals 13, 14, or, as shown in FIG. 6, a surge protector device unit. As shown in FIG. 7 the different component units of the present invention are sued in series, such as an illuminator, a timer and a socket assembly.

Therefore, the present invention can include a selective combination in series. If one of the units is damaged or is not in use, it can be put aside, and the other units can still act in series. In addition, the various components can be formed into standardized design.

The present invention discloses only a preferred embodiment, partial modification or variation from the technical idea of the present invention and which are easily inferred by those skilled in the art shall belong to the claimed scope of the present invention.

What is claimed is:

1. A power receiver/supply device comprising:

a) a plurality of modular units, each modular unit having: a first end with a male terminal, the male terminal including a first end seat and an end pin extending from the first end seat, the end pin located entirely within the male terminal; a second end opposite the first end and having a female terminal, the female terminal including a second end seat and an end sleeve extending from the second end seat, the end sleeve having an end sleeve hole therein and being located entirely within the female terminal; a first wire end inserted into the first end seat of the male terminal; a second wire end inserted into the second end seat of the female terminal; and threaded elements engaging the first and second end seats and the associated wire ends to attach the wire ends to the male and female terminals, whereby the male terminal of each modular unit is engageable with the female terminal of an adjacent modular unit to connect adjacent modular units together;

b) at least one modular unit having a plurality of sockets therein; and, c) at least one modular unit having an electrical component comprising a timer.

* * * * *